: US 9,632,805 B2
(45) Date of Patent: Apr. 25, 2017

(12) United States Patent
Wang et al.

(54) DATA STORAGE DEVICE AND ERROR CORRECTION METHOD THEREOF

(71) Applicant: Silicon Motion, Inc., Jhubei (TW)

(72) Inventors: Shih-Ming Wang, Zhubei (TW); Chia-Fang Chang, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 129 days.

(21) Appl. No.: 14/298,392

(22) Filed: Jun. 6, 2014

(65) Prior Publication Data
US 2015/0127888 A1    May 7, 2015

(30) Foreign Application Priority Data

Nov. 1, 2013  (TW) .............................. 102139708 A

(51) Int. Cl.
*G06F 12/02*       (2006.01)
*G06F 9/445*       (2006.01)
(52) U.S. Cl.
CPC .............................. *G06F 9/44505* (2013.01)

(58) Field of Classification Search
CPC ............... G06F 12/0246; G06F 11/006; G06F 11/0727; G06F 3/0619; G06F 3/0679; G06F 3/0652; G06F 2206/1014; G06F 9/445; G06F 9/30
USPC .................................................. 711/103, 154
See application file for complete search history.

(56) References Cited

U.S. PATENT DOCUMENTS 9,092,233 B2 *  7/2015  Andrews ............... G06F 9/4416

* cited by examiner

*Primary Examiner* — Jasmine Song
(74) *Attorney, Agent, or Firm* — Wang Law Firm, Inc.

(57) ABSTRACT

A firmware loading system including a first memory device and a calculation unit. The first memory device includes a first firmware code, wherein the first firmware code has a predetermined code and a plurality of parameter tables, and the parameter tables are arranged to set up a plurality of registers of a second memory device. The calculation unit is arranged to perform a firmware insertion procedure, wherein, during the firmware insertion procedure, the calculation unit selects one of the parameter tables according to a selection signal, compiles the selected parameter table and the predetermined code into a second firmware code, and writes the second firmware code in a flash memory of the second memory device.

16 Claims, 5 Drawing Sheets

DATA STORAGE DEVICE AND ERROR CORRECTION METHOD THEREOF

CROSS REFERENCE TO RELATED APPLICATIONS

This Application claims priority of Taiwan Patent Application No. 102139708, filed on Nov. 1, 2013, the entirety of which is incorporated by reference herein.

BACKGROUND OF THE INVENTION

Field of the Invention

The present invention relates to a firmware loading system and in particular to a firmware loading system compatible with a plurality of memory devices.

Description of the Related Art

Flash memory is considered a non-volatile data storage device, using electrical methods to erase and program itself Taking NAND Flash as an example, it is often used as a memory card, USB flash device, solid state device, eMMC and other uses.

However, different manufacturers' portable devices come with different default values of flash memory. As with default values, different versions and different manufacturers have different firmware codes, causing usage and compiling difficulties for program developers and users alike.

BRIEF SUMMARY OF THE INVENTION

A detailed description is given in the following embodiments with reference to the accompanying drawings.

The present invention provides a firmware loading system. The firmware loading system includes a first memory device and a calculation unit. The first memory device includes a first firmware code, wherein the first firmware code has a predetermined code and a plurality of parameter tables, and the parameter tables are arranged to set up a plurality of registers of a second memory device. The calculation unit is arranged to perform a firmware insertion procedure, wherein, during the firmware insertion procedure, the calculation unit selects one of the parameter tables according to a selection signal, compiles the selected parameter table and the predetermined code into a second firmware code, and writes the second firmware code in a flash memory of the second memory device.

The present invention further provides another firmware loading system. The firmware loading system includes a first memory device and a calculation unit. The first memory device includes a first firmware code, wherein the first firmware code has a predetermined code and a plurality of parameter tables, and each of the parameter tables has a plurality of predetermined parameters arranged to set up a plurality of registers of a second memory device. The calculation unit is arranged to perform a firmware insertion procedure, wherein, during the firmware insertion procedure, the calculation unit selects a predetermined parameter from each of the parameter tables according to a plurality of selection signals, compiles the selected predetermined parameters and the predetermined code into a second firmware code, and writes the second firmware code into a flash memory of the second memory device.

The present invention provides a firmware loading method applied to a firmware loading system. The firmware loading method includes: performing a firmware insertion procedure according to an enable signal; receiving a selection signal in the firmware insertion procedure; selecting one of a plurality of parameter tables of a first firmware code according to the selection signal in the firmware insertion procedure, wherein the first firmware code comprises a predetermined code and the parameter tables, and the parameter tables are arranged to set up a plurality of registers of a second memory device; compiling the selected parameter table and the predetermined code into a second firmware code; and writing the second firmware code in a flash memory of the second memory device.

The present invention provides another firmware loading method applied to a firmware loading system. The firmware loading method includes: performing a firmware insertion procedure according to an enable signal: receiving a plurality of selection signals in the firmware insertion procedure; selecting a predetermined parameter from each of a plurality of parameter tables according to the respective selection signals, in the firmware insertion procedure, wherein the first firmware code has a predetermined code and the a plurality of parameter tables, and the parameter tables are arranged to set up a plurality of registers of a second memory device; compiling the selected predetermined parameters and the predetermined code into a second firmware code; and writing the second firmware code into a flash memory of the second memory device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
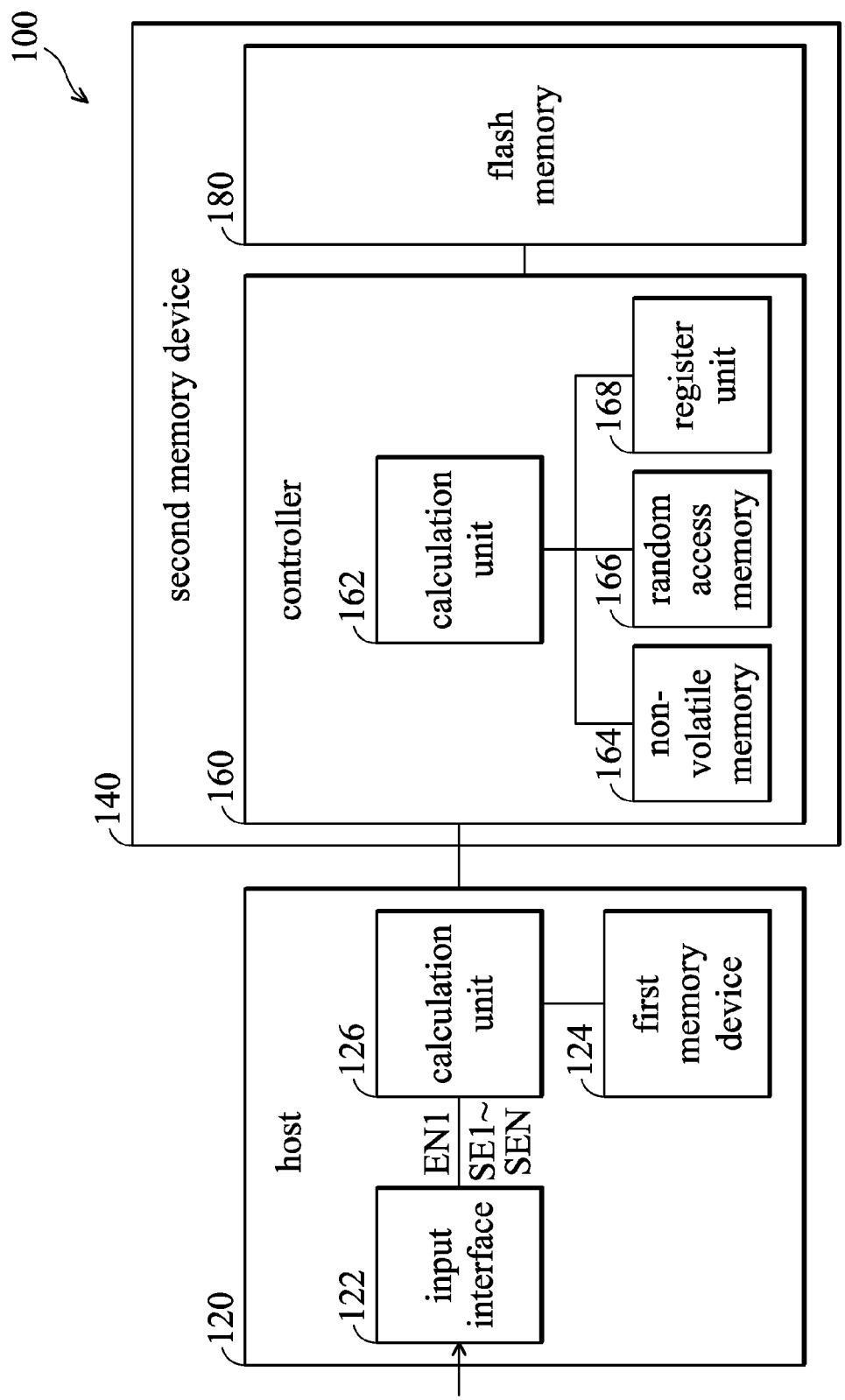
FIG. 1 is a schematic diagram illustrating an embodiment of a firmware loading system of the present invention.

FIG. 1 is a schematic diagram illustrating an embodiment of a firmware loading system of the present invention. The firmware loading system 100 includes a host 120 and a second memory device 140. The host 120 includes an input interface 122, a first memory device 124 and a calculation unit 126. The input interface 122 is arranged to receive the input signals input by users, produce the enable signal EN1 and the selection signals SE1~SEN corresponding to the input signals, and transmit the enable signal EN1 and the selection signal SE1~SEN to the calculation unit 126. The first memory device 124 is arranged to store a first firmware code. The first firmware code includes a predetermined code and a plurality of parameter tables. The parameter tables are arranged to set up the registers of the register unit 168 of the second memory device 140. The calculation unit 126 is arranged to perform a firmware insertion procedure according to the enable signal EN1 input by users. In the firmware insertion procedure, the calculation unit 126 is arranged to compile the predetermined code and the parameter tables into a second firmware code and write the second firmware code into a flash memory 180 of the second memory device 140.

The second memory device 140 includes a flash memory 180 and a controller 160 and operates in response to the commands of the host 120. The controller 160 includes a calculation unit 162, a non-volatile memory 164 (such as, read only memory ROM), a random access memory (RAM) 166 and a register unit 168, wherein the register unit 168 includes a plurality of registers (not shown). The non-volatile memory 164 stores a ROM code. When the second memory device 140 is turned on or powered on, the calculation unit 162 loads the ROM code into the random access memory 166 to be executed from the non-volatile memory 164. The controller 160 retrieves the second firmware code from the flash memory 180 in response to the ROM code to set up the registers of the register unit 168. More specifically, the calculation unit 162 sets up the registers of the register unit 168 according to the parameters of the second firmware code. Therefore, the controller 162 may access the flash memory 180 properly according to the parameters. The flash memory 180 includes a plurality of blocks and each of the blocks includes a plurality of pages.

Figure 2:
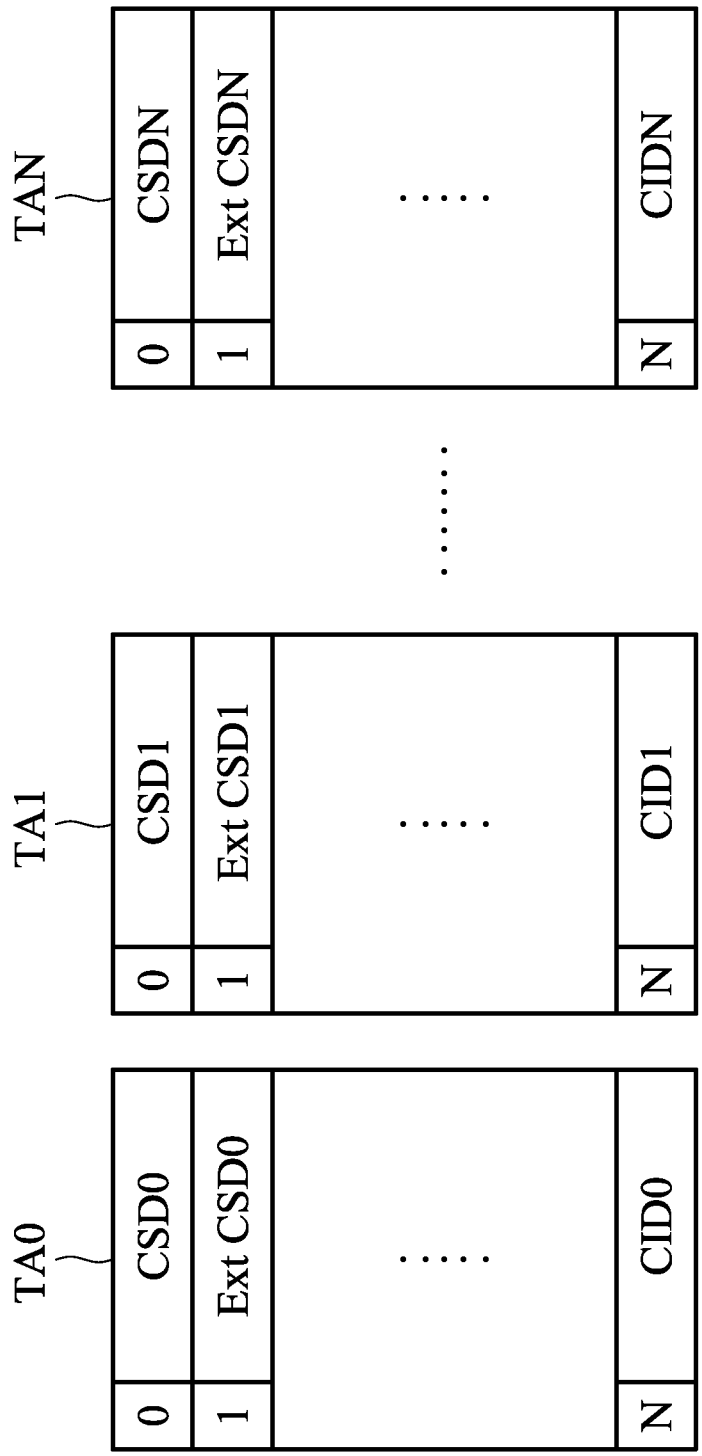
FIG. 2 is a schematic diagram illustrating an embodiment of parameter tables of the present invention.

FIG. 2 is a schematic diagram illustrating an embodiment of parameter tables of the present invention. In the present embodiment, the first firmware code stored in the first memory device 124 includes a plurality of parameter tables TA0~TAN. Each of the parameter tables TA0~TAN includes a set of parameters, with each set of parameters including a card specific data (CSD), a card identification data (CID) and an extended card specific data (ExtCSD), wherein the parameters in different tables may be different, but it is not limited thereto. Namely, each of the parameter tables TA0~TAN includes a card specific data, a card identification data and an extended card specific data ExtCSD0~ExtCSDN. For example, the parameter table TA0 has a card specific data CSD0, a card identification data CID0 and an extended card specific data ExtCSD0. The parameter table TA1 has a card specific data CSD1, a card identification data CID1 and an extended card specific data ExtCSD1. The parameter table TAN has a card specific data CSDN, a card identification data CIDN and an extended card specific data ExtCSDN. It should be noted that the card specific data CSD0~CSDN and the extended card specific data ExtCSD0~ExtCSDN are arranged to indicate the version of the memory device and set up a plurality of actions and indicate the commands of the second memory device 140. For example, the card specific data CSD0 may include the parameters corresponding to the version of the first firmware code, the power off notification, the package command, etc., but it is not limited thereto. The card identification data CID0~CIDN are arranged to represent a manufacture identification code (Manufacture ID) of the second memory device 140. In this embodiment, in the firmware insertion procedure, the calculation unit 126 selects one of the parameter tables TA0~TAN according to a selection signal, compiles the selected parameter table and the predetermined code into the second firmware code, and writes the second firmware code into the flash memory 180 of the second memory device 140. For example, when the selection signal indicates the parameter table TA1, the calculation unit 126 retrieves the card specific data CSD1, the extended card specific data ExtCSD1 and the card identification data CID1 of the parameter tables TA1 according to the selection signal, compiles the card specific data CSD1, the extended card specific data ExtCSD1 the card identification data CID1 and the predetermined code into the second firmware code, and writes the second firmware code into the flash memory 180 of the second memory device 140.

Figure 3:
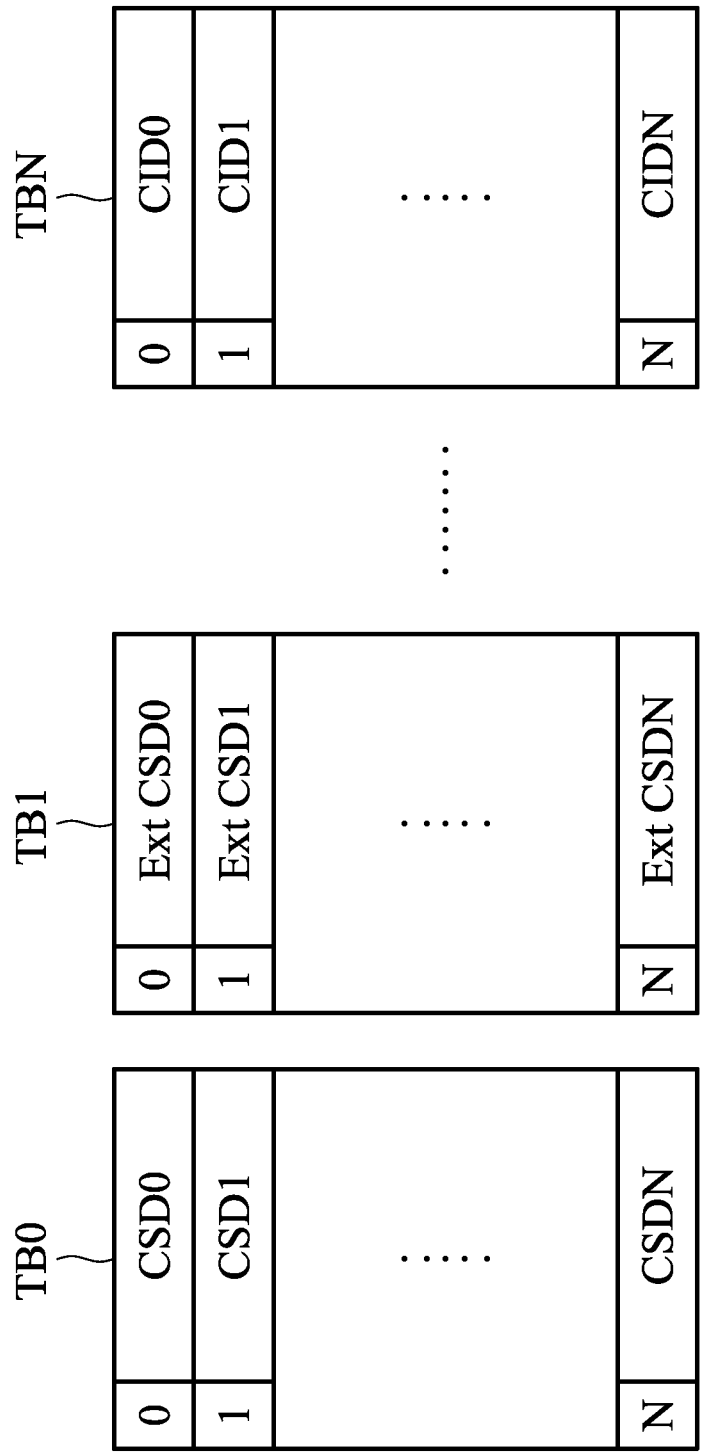
FIG. 3 is a schematic diagram illustrating another embodiment of parameter tables of the present invention.

FIG. 3 is a schematic diagram illustrating another embodiment of parameter tables of the present invention. In this embodiment, the first firmware code stored in the first memory device 124 has a plurality of parameter tables TB0~TBN. Each of the parameter tables TB0~TBN includes different types of predetermined parameters, respectively. For example, the predetermined parameters of the parameter table TB0 are a set of card specific data (CSD; Card Specific Data) CSD0~CSDN. The predetermined parameters of parameter table TB1 are a set of extended card specific data (ExtCSD; Extended Card Specific Data) ExtCSD0~ExtCSDN. The predetermined parameters of the parameter table TBN are a set of card identification data (CID; Card ID) CID0~CIDN. It should be noted that the card specific data CSD0~CSDN and the extended card specific data ExtCSD0~ExtCSDN are arranged to indicate version of memory device and set up a plurality of actions and commands of the second memory device 140. The card identification data CID0~CIDN are arranged to represent a manufacture identification code (Manufacture ID) of the second memory device 140. In this embodiment, in the firmware insertion procedure, the calculation unit 126 selects a predetermined parameter from each of the parameter tables TB0~TBN according to a plurality of selection signals SE1~SEN, compiles the selected predetermined parameters and the predetermined code into the second firmware code, and writes the second firmware code into the flash memory 180 of the second memory device 140. For example, when the first selection signal SE1 indicates the card specific data CSD0 of the parameter tables TB0, the second selection signal SE2 indicates the extended card specific data ExtCSD5 of parameter tables TB1, the third selection signal SE3 indicates the card identification data CID3 of the parameter table TBN, the calculation unit 126 selects the card specific data CSD0, the extended card specific data ExtCSD5 and the card identification data CID3 according to the first, second and third selection signal SE1~SE3. The calculation unit 126 compiles the selected card specific data CSD0, the selected extended card specific data ExtCSD5, the selected card identification data CID3 and the predetermined code into the second firmware code, and writes the second firmware code into the flash memory 180 of the second memory device 140.

Figure 4:
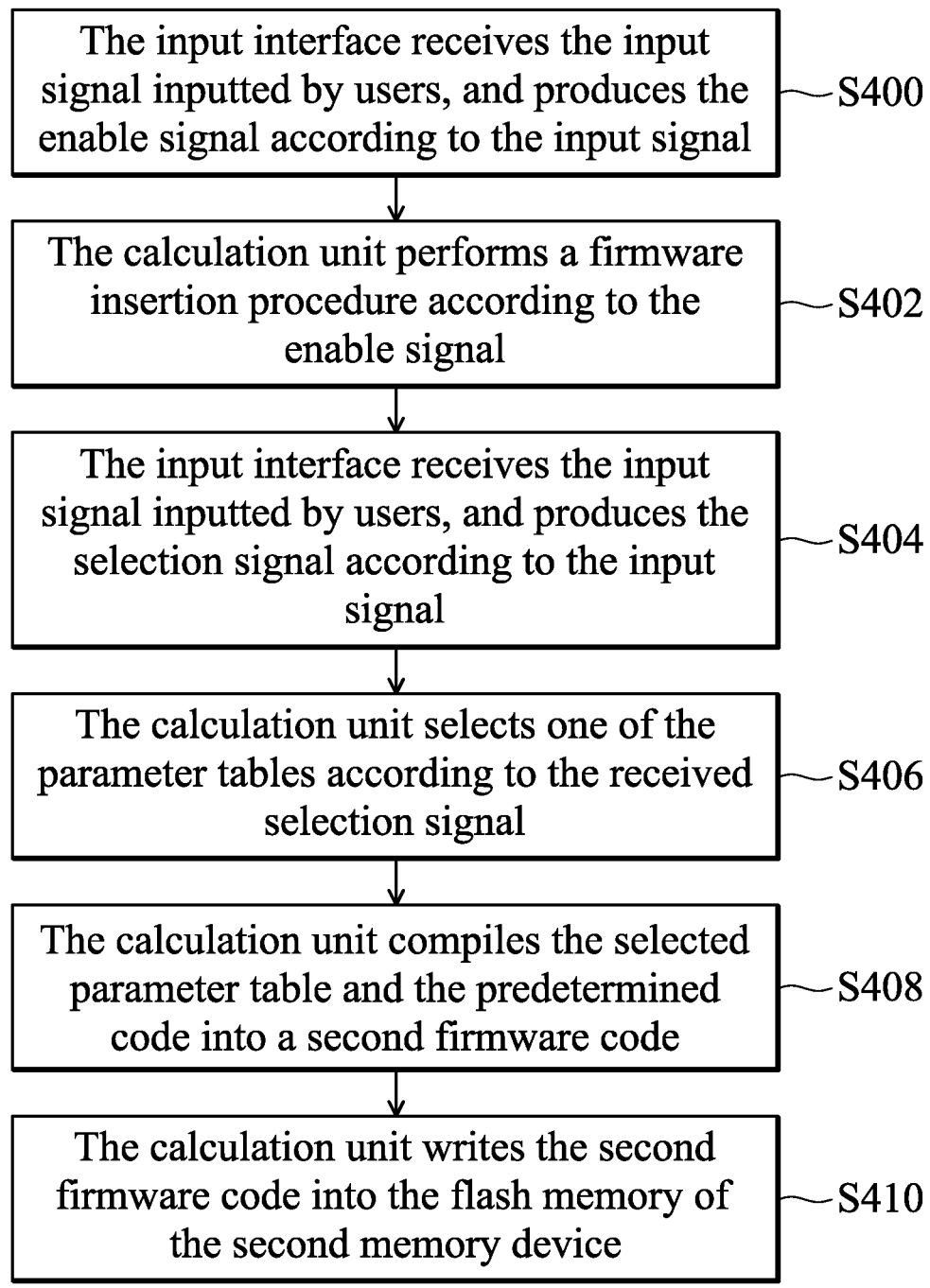
FIG. 4 is a flowchart of a firmware loading method according to an embodiment of the present invention.

FIG. 4 is a flowchart of a firmware loading method according to an embodiment of the present invention. The firmware loading method is applied to the firmware loading system 100 of FIG. 1 and the parameter tables of FIG. 2. The process starts at step S400.

In step S400, the input interface 122 is arranged to receive the input signal input by users, and produce the enable signal EN1 according to the input signal. Moreover, the input interface 122 is further arranged to transmit the enable signal EN1 to the calculation unit 126.

Next, in step S402, the calculation unit 126 is arranged to perform a firmware insertion procedure according to the enable signal EN1.

Next, in step S404, the input interface 122 is arranged to receive the input signal input by users, and produce the selection signal SE1 according to the input signal. Moreover, the input interface 122 is further arranged to transmit the selection signal SE1 to the calculation unit 126.

Next, in step S406, the calculation unit 126 selects one of the parameter tables TA0~TAN according to the received selection signal. In this embodiment, the first firmware code stored in the first memory device 124 includes a plurality of parameter tables TA0~TAN. Each of the parameter tables TA0~TAN includes a set of parameters, and each set of parameters includes a card specific data (Card Specific Data, CSD) CSD0~CSDN, a card identification data (Card ID, CID) CID0~CIDN and an extended card specific data (Extended Card Specific Data, ExtCSD) ExtCSD0~ExtCSDN, as shown in FIG. 2. It should be noted that the card specific data CSD0~CSDN and extended card specific data ExtCSD0~ExtCSDN are arranged to indicate version of memory device and set up a plurality of actions and commands of the second memory device 140. For example, the card specific data CSD0 may include the parameters corresponding to the version of the first firmware code, the power off notification, the package command, etc., but it is not limited thereto. The card identification data CID0~CIDN are arranged to represent a manufacture identification code (Manufacture ID) of the second memory device 140. In this embodiment, in the firmware insertion procedure, the calculation unit 126 selects one of the parameter tables TA0~TAN according to the received selection signal. When the received selection signal indicates the parameter tableTA1. The calculation unit 126 retrieves the card specific data CSD1, the extended card specific data ExtCSD1 and the card identification data CID1 of the parameter tableTA1 according to the received selection signal.

Next, in step S408, the calculation unit 126 compiles the selected parameter table and the predetermined code into a second firmware code. For example, when the selection signal indicates the parameter table TA1. The calculation unit 126 retrieves the card specific data CSD1, the extended card specific data ExtCSD1 and the card identification data CID1 of the parameter tableTA1 according to the received selection signal, and compiles the card specific data CSD1, the extended card specific data ExtCSD1 the card identification data CID1 and the predetermined code into the second firmware code.

Next, in step S410, the calculation unit 126 writes the second firmware code into the flash memory 180 of the second memory device 140.

Figure 5:
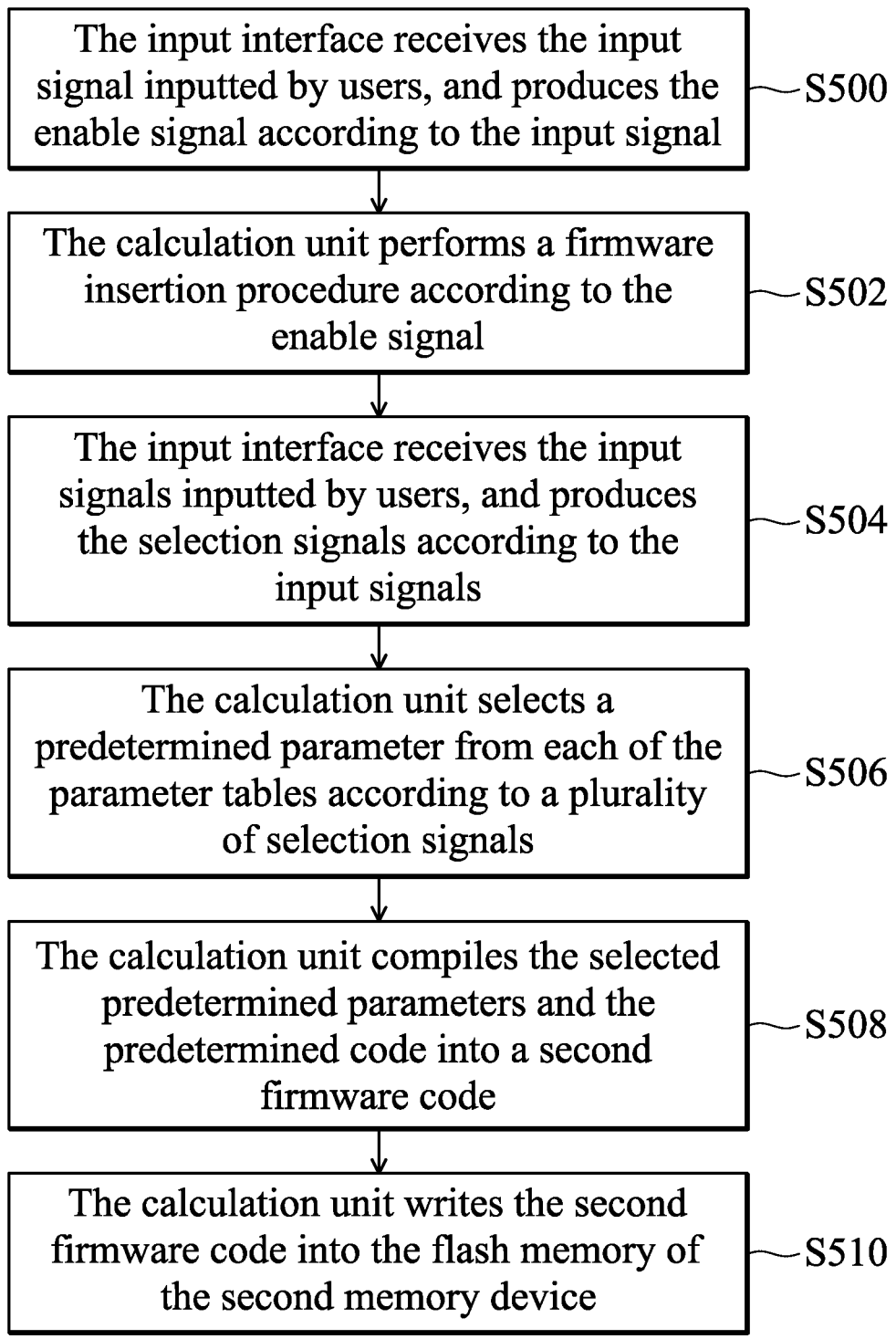
FIG. 5 is a flowchart of a firmware loading method according to another embodiment of the present invention.

FIG. 5 is a flowchart of a firmware loading method according to another embodiment of the present invention. The firmware loading method is applied to the firmware loading system 100 of FIG. 1 and the parameter tables of FIG. 3. The process starts at step S500.

In step S500, the input interface 122 is arranged to receive the input signal input by users, and produce the enable signal EN1 according to the input signal. Moreover, the input interface 122 is further arranged to transmit the enable signal EN1 to the calculation unit 126.

Next, in step S502, the calculation unit 126 is arranged to perform a firmware insertion procedure according to the enable signal EN1.

Next, in step S504, the input interface 122 is arranged to receive the input signals input by users, and produce the selection signals SE1~SEN according to the input signals. Moreover, the input interface 122 is further arranged to transmit the selection signals SE1~SEN to the calculation unit 126.

Next, in step S506, the calculation unit 126 selects a predetermined parameter from each of the parameter tables TB0~TBN according to a plurality of selection signals SE1~SEN. In this embodiment, the first firmware code stored in the first memory device 124 has a plurality of parameter tables TB0~TBN. Each of the parameter tables TB0~TBN includes different types of predetermined parameters, respectively. For example, the parameter table TB0 has a set of card specific data (CSD; Card Specific Data) CSD0~CSDN. The parameter table TB1 has a set of extended card specific data (ExtCSD; Extended Card Specific Data) ExtCSD0~ExtCSDN. The parameter table TBN has a set of card identification data (CID; Card ID) CID0~CIDN. It should be noted that the card specific data CSD0~CSDN and the extended card specific data ExtCSD0~ExtCSDN are arranged to indicate version of memory device and set up a plurality of actions and commands of the second memory device 140. The card identification data CID0~CIDN are arranged to represent a manufacture identification code (Manufacture ID) of the second memory device 140. In this embodiment, calculation unit 126 selects a predetermined parameter from each of the parameter tables TB0~TBN according to a plurality of selection signals SE1~SEN. For example, when the first selection signal SE1 indicates the card specific data CSD0 of the parameter tables TB0, the second selection signal SE2 indicates the extended card specific data ExtCSD5 of parameter tables TB1, the third selection signal SE3 indicates the card identification data CID3 of the parameter table TBN, the calculation unit 126 selects the card specific data CSD0, the extended card specific data ExtCSD5 and the card identification data CID3 according to the first selection signal to the third selection signal SE1~SE3.

Next, in step S508, the calculation unit 126 compiles the selected predetermined parameters and the predetermined code into a second firmware code. For example, when the calculation unit 126 selects the card specific data CSD0, the extended card specific data ExtCSD5 and the card identification data CID3 according to the first, second and third selection signal SE1~SE3, the calculation unit 126 compiles the selected card specific data CSD0, the selected extended card specific data ExtCSD5, the selected card identification data CID3 and the predetermined code into the second firmware code.

Next, in step S510, the calculation unit 126 writes the second firmware code into the flash memory 180 of the second memory device 140.

The firmware loading system 100 and the firmware loading method of the present invention provide a firmware compatible with the devices of different manufacturers.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A firmware loading system, comprising:
   a first memory device, comprising a first firmware code, wherein the first firmware code has a predetermined code and a plurality of parameter tables, each of the parameter tables has a plurality of predetermined parameters, and the predetermined parameters of the parameter tables are arranged to set up a plurality of registers of a second memory device; and
   a calculation unit, arranged to perform a firmware insertion procedure, wherein, during the firmware insertion procedure, the calculation unit selects one of the parameter tables according to a selection signal, compiles the predetermined code with the predetermined parameters of the selected parameter table into a second firmware code, and writes the second firmware code in a flash memory of the second memory device.

2. The firmware loading system as claimed in claim 1, wherein the predetermined parameters of each of the parameter tables constitute a set of parameters, and each of the sets of parameters comprises a card specific data (CSD), a card identification data (CID) and an extended card specific data (ExtCSD).

3. The firmware loading system as claimed in claim 2, wherein the card specific data and the extended card specific data are arranged to indicate version of memory device and set up a plurality of actions and commands of the second memory device.

4. The firmware loading system as claimed in claim 2, wherein the card identification data represents a manufacture identification code of the second memory device.

5. A firmware loading system, comprising:
   a first memory device, comprising a first firmware code, wherein the first firmware code has a predetermined code, a first parameter table and a second parameter table, the first parameter table has a plurality of predetermined parameters arranged to set up a plurality of registers of a second memory device, and the second parameter table has a plurality of predetermined parameters arranged to set up the registers of the second memory device; and
   a calculation unit, arranged to perform a firmware insertion procedure, wherein, during the firmware insertion procedure, the calculation unit selects a first predetermined parameter from the first parameter table and a second predetermined parameter from the second parameter table according to a plurality of selection signals, compiles the predetermined code with the first predetermined parameter and the second predetermined parameter into a second firmware code, and writes the second firmware code into a flash memory of the second memory device.

6. A firmware loading system as claimed in claim 5, wherein the predetermined parameters of the first parameter table are a set of card specific data (CSD), a set of card identification data (CID) or a set of extended card specific data (ExtCSD), the predetermined parameters of the second parameter table are the set of card specific data (CSD), the set of card identification data (CID) or set of extended card specific data (ExtCSD) which is different from the predetermined parameters of the first parameter table.

7. A firmware loading system as claimed in claim 6, wherein the card specific data and the extended card specific data are arranged to indicate version of memory device and set up a plurality of actions and commands of the second memory device.

8. A firmware loading system as claimed in claim 5, wherein the card identification data represents a manufacture identification code of the second memory device.

9. A firmware loading method, applied to a firmware loading system, comprising:
   performing a firmware insertion procedure according to an enable signal;
   receiving a selection signal in the firmware insertion procedure;
   selecting one of a plurality of parameter tables of a first firmware code according to the selection signal in the firmware insertion procedure, wherein the first firmware code comprises a predetermined code and the parameter tables, each of the parameter tables has a plurality of predetermined parameters, and the predetermined parameters of the parameter tables are arranged to set up a plurality of registers of a second memory device;
   compiling the predetermined code with the predetermined parameters of the selected parameter table into a second firmware code; and
   writing the second firmware code in a flash memory of the second memory device.

10. The firmware loading method as claimed in claim 9, wherein the predetermined parameters of each of the parameter tables constitute a set of parameters, wherein each of the set of the parameters comprises a card specific data (CSD), a card identification data (CID) and an extended card specific data (ExtCSD).

11. The firmware loading method as claimed in claim 10, wherein the card specific data and the extended card specific data are arranged to indicate version of memory device and set up a plurality of actions and commands of the second memory device.

12. The firmware loading method as claimed in claim 10, wherein the card identification data represents a manufacture identification code of the second memory device.

13. A firmware loading method applied to a firmware loading system, comprising:
   performing a firmware insertion procedure according to an enable signal:
   receiving a plurality of selection signals in the firmware insertion procedure;
   selecting a first predetermined parameter from a plurality of predetermined parameters of a first parameter table and selecting a second predetermined parameter form a plurality of predetermined parameters of a second parameter table according to the selection signals in the firmware insertion procedure, wherein the first firmware code has a predetermined code,the first parameter table and the second parameter table, and the predetermined parameters of the first parameter table are arranged to set up a plurality of registers of a second memory device, and the predetermined parameters of the second parameter table are arranged to set up the registers of the second memory device;
   compiling the predetermined code with the first predetermined parameter and the second predetermined parameter into a second firmware code; and
   writing the second firmware code into a flash memory of the second memory device.

14. The firmware loading method as claimed in claim 13, wherein the predetermined parameters of the first parameter table are a set of card specific data (CSD), a set of card identification data (CID) or a set of extended card specific data (ExtCSD), the predetermined parameters of the second parameter table are the set of card specific data (CSD), the set of card identification data (CID) or set of extended card specific data (ExtCSD) which is different from the predetermined parameters of the first parameter table.

15. The firmware loading method as claimed in claim 14, wherein the card specific data and the extended card specific data are arranged to indicate version of memory device and set up a plurality of actions and commands of the second memory device.

16. The firmware loading method as claimed in claim 13, wherein the card identification data represents a manufacture identification code of the second memory device.

\* \* \* \* \*